United States Patent
Koskinen et al.

(10) Patent No.: US 7,805,126 B2
(45) Date of Patent: *Sep. 28, 2010

(54) CHARGING IN A COMMUNICATION SYSTEM

(75) Inventors: Juha-Pekka Koskinen, Hämeenlinna (FI); Juha R. Vallinen, Tampere (FI)

(73) Assignee: Nokia Corporation, Espoo (FI)

( * ) Notice: Subject to any disclaimer, the term of this patent is extended or adjusted under 35 U.S.C. 154(b) by 2038 days.

This patent is subject to a terminal disclaimer.

(21) Appl. No.: 10/464,862

(22) Filed: Jun. 19, 2003

(65) Prior Publication Data

US 2004/0152443 A1 Aug. 5, 2004

Related U.S. Application Data

(60) Provisional application No. 60/444,658, filed on Feb. 4, 2003.

(51) Int. Cl.
*H04M 11/00* (2006.01)

(52) U.S. Cl. .............. 455/406; 405/408; 405/420; 379/126; 379/144.01

(58) Field of Classification Search .......... 455/406, 455/408; 379/126, 144.01, 144.02
See application file for complete search history.

(56) References Cited

U.S. PATENT DOCUMENTS

| | | | | | |
|---|---|---|---|---|---|
| 5,511,113 | A | * | 4/1996 | Tasaki et al. | 379/114.28 |
| 6,463,275 | B1 | * | 10/2002 | Deakin | 455/406 |
| 6,654,589 | B1 | * | 11/2003 | Haumont | 455/67.11 |
| 6,754,320 | B2 | * | 6/2004 | Daase et al. | 379/121.01 |
| 6,839,356 | B2 | * | 1/2005 | Barany et al. | 370/401 |
| 6,970,694 | B2 | * | 11/2005 | Shaheen | 455/414.1 |
| 7,082,540 | B1 | * | 7/2006 | Ruparelia et al. | 713/193 |
| 7,180,984 | B1 | * | 2/2007 | Samarasinghe | 379/88.13 |
| 7,203,200 | B2 | * | 4/2007 | Ala-Luukko | 370/401 |
| 2002/0068545 | A1 | * | 6/2002 | Oyama et al. | 455/406 |
| 2002/0146005 | A1 | * | 10/2002 | Gallant et al. | 370/389 |
| 2002/0191597 | A1 | * | 12/2002 | Lundstrom | 370/356 |
| 2003/0096592 | A1 | * | 5/2003 | Moreau et al. | 455/406 |
| 2003/0118010 | A1 | * | 6/2003 | Ala-Luukko | 370/353 |
| 2003/0165222 | A1 | * | 9/2003 | Syrjala et al. | 379/114.26 |
| 2004/0101117 | A1 | * | 5/2004 | Koskinen et al. | 379/126 |
| 2005/0259804 | A1 | * | 11/2005 | Bedingfield | 379/211.02 |

* cited by examiner

*Primary Examiner*—Minh D Dao
(74) *Attorney, Agent, or Firm*—Alston & Bird LLP

(57) ABSTRACT

A method for charging for services in a communication system comprises a charging entity. The method comprises a step of sending a first message to the charging entity. The method also comprises a step of generating a charging identity at the charging entity if it is determined that the first message does not include a charging identity.

27 Claims, 2 Drawing Sheets

------ Signalling Interface
——— Signalling and Data Transfer Interface

*)those elements are duplicated for figure layout purpose only, they belong to the same logical element in the reference model

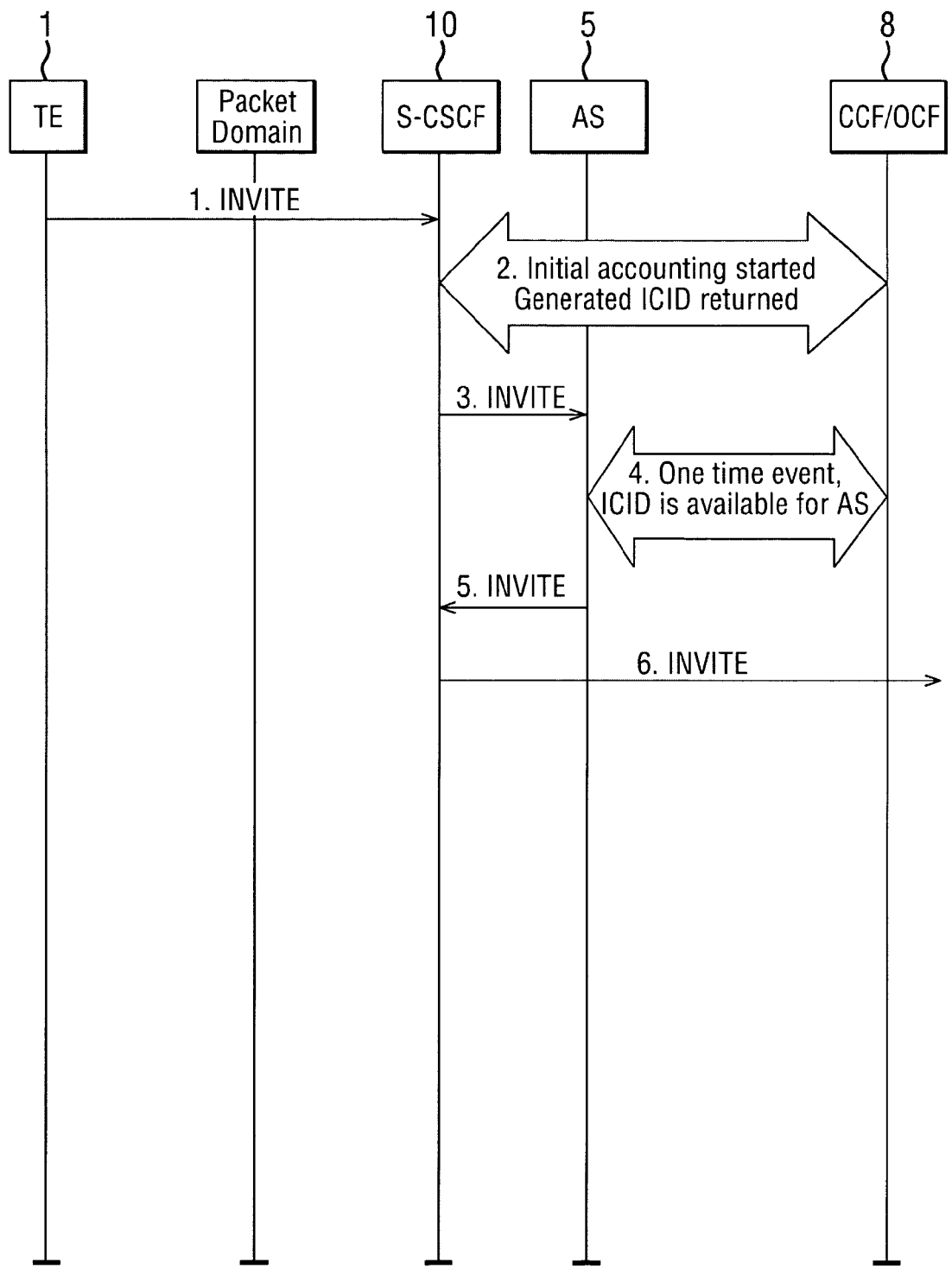

CHARGING IN A COMMUNICATION SYSTEM

CROSS-REFERENCE TO RELATED APPLICATIONS

This application claims priority of U.S. Provisional Application Ser. No. 60/444,658 entitled, "Charging in a Communication System," filed Feb. 4, 2003, the entire contents of which are incorporated herein by reference.

BACKGROUND OF THE INVENTION

1. Field of the Invention

This invention relates to charging for services in a communication system such as a mobile telephony system.

2. Description of the Related Art

In a basic communication system a simple communication network is provided, which can link together two communication terminals so that the terminals can communicate with each other in a communication session or call. Conventionally, a designated entity in the network uses a stored tariff to determine a charge for a call based on the call's duration. Each terminal user has a charging account with the operator of the network. The charge for a call is then allocated to the charging account of the user of the terminal that originated the call. When a call is in progress the network may use the tariff to estimate the charge due in respect of the call so far. The network may periodically transmit that estimated charge to the terminal that originated the call, and the estimated charge may then be displayed by that terminal so that its user can see the ongoing cost of the call.

However, for third generation (3G) communication systems the systems of more than one operator may be used for carrying a call, and operators of all of those systems may be able to levy charges independently for the services they provide in supporting the call. A system of this sort applies the charges made by a number of operators for a single call to the correct account by generating charging data records (CDRs) that include a global charging identifier (ICID) that relates to a call. The global charging identifier may be generated by the first network entity to begin charging for a call, or by the first entity to generate a CDR. It is therefore necessary for different network entities to support ICID generation.

It is therefore an aim of embodiments of the present invention to overcome the need for different network entities to support ICID generation.

SUMMARY OF THE INVENTION

According to a one embodiment of the present invention there is provided a method for charging for services in a communication system comprising a charging entity. The method comprises: sending a first message to the charging entity; and generating a charging identity at the charging entity if it is determined that the first message does not include a charging identity.

According to a another aspect of the present invention there is provided a communication system comprising a charging entity arranged to generate a charging identity in response to receiving a first message if it is determined that the first message does not include a charging identity.

According to a further aspect of the present invention there is provided a charging entity for use in a communications system. The charging entity is configured to generate a charging identity in response to receiving a first message if it is determined that the first message does not include a charging identity.

BRIEF DESCRIPTION OF DRAWINGS

Embodiments of the present invention will now be described by way of example only with reference to the accompanying drawings, in which:

FIG. 2 is a signaling diagram according to an embodiment of the present invention.

DETAILED DESCRIPTION OF THE PREFERRED EMBODIMENTS

Figure 1:
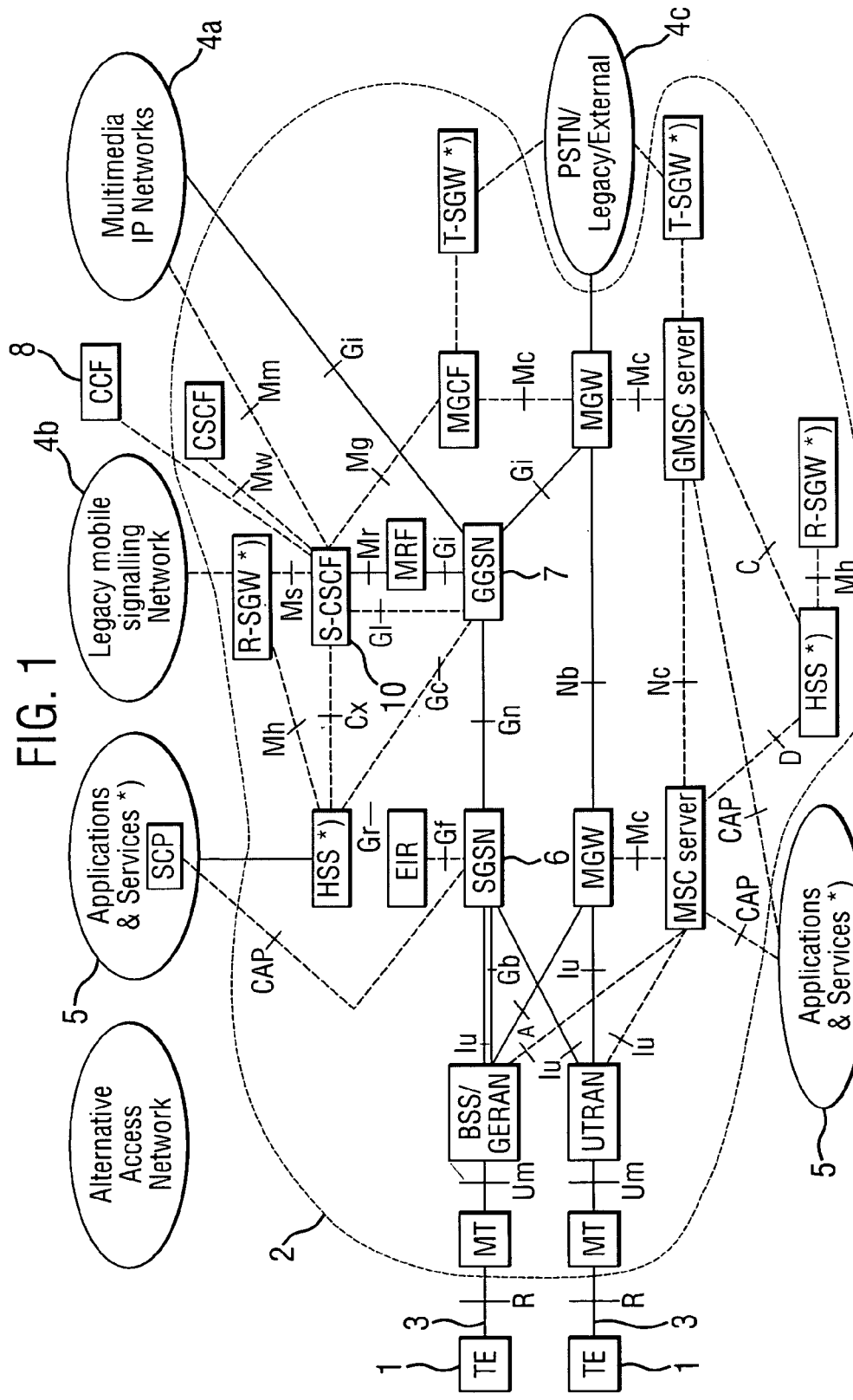
FIG. 1 is a schematic diagram of a communication network.

Embodiments of the present invention will be described by way of example with reference to the architecture of a 3G network. However, it will be understood that it can be applied to any other suitable form of network.

FIG. 1 depicts the architecture of an all-IP (internet protocol) UMTS (universal mobile telecommunications system) system. Boxes and ellipses in FIG. 1 indicate network elements, which are annotated by their standard abbreviations. The network elements are connected by interfaces indicated by lines, whose types are indicated by their standard abbreviations next to the lines. Network elements whose abbreviations carry the suffix "*)" in FIG. 1 are duplicated in the figure for ease of layout, but belong to the same logical element in the UMTS reference model.

In the system of FIG. 1, items of terminal equipment (TE) 1 can communicate with the UMTS network 2 via radio (R) interface 3. By this means the TEs can communicate with other TEs that are connected directly to the UMTS network or are connected to other networks 4 that are connected to the UMTS network. The TEs can also receive applications and services from application/service platform 5.

The core network section of the network includes a GGSN (gateway support node 7, an SGSN (serving GPRS support node) 6, and an S-CSCF (Serving Call State Control Function) 10. In addition the network has a CCF (changing control function) 8, otherwise known as an Online Charging Function (OCF). The general functions of most of the units in FIG. 1 are well known and will not be described in detail here. The CCF 8 is responsible for collecting data on charges for the subscriber of terminal network 2. In a preferred embodiment of the invention the CCF 8 is also responsible for generating a global charging identifier (ICID). This feature of the invention will be explained in more detail herein after. Each network may include a number of CCFs each of which serves a subset of subscribers to that network. A CCF can be a logical function that is part of the CPS (call processing server) or Service Creation Environment (SCE).

In the embodiment illustrated in FIG. 1, the charging control information for generating charges for separate services provided to support a connection or call can be generated from a number of entities:

1. The applications and services unit 5 (SCP or otherwise): for example to make a charge to a user for the use of a supplementary or value-added service (e.g. call forwarding, call transfer or recommendation of a restaurant local to the user).
2. The access network (the SGSN 6 or GGSN 7): for provision to the user of access for his terminal to the UMTS network.

3. The multimedia IP network (4a): for provision of access to a network and/or for access to specific data from the network and optionally for guaranteeing the quality of service in the network.
4. Legacy networks such as legacy mobile communication network 4b and legacy PSTN network 4c: for provision of access to those networks.
5. Core network (CPS—a physical element which includes the S-CSCF (serving call control service function) 10 and optionally the MGCF too): for use by the UMTS core network for transfering of data.

The charging means described herein makes use of charging data records (CDR) which are generated in the entities that levy charges and allow the charging control information to be passed in a coherent way. There are several forms of CDR, depending on the unit that generates the CDR. However, all the CDRs include an ICID which allows the CDRs that have been generated in response to a single communication to be matched up.

The ICID provides a unique identifier for each connection/call. Each CDR includes a global charging ID field which includes the ICID of the call to which the information in it relates.

The generation of the global charging ID in accordance with a preferred embodiment of the present invention will now be described. FIG. 2 is a signaling diagram that shows the signaling process for setting up a call from an initiating terminal (TE) 1 to another terminal (not shown) via an S-CSCF 10, an Application Server (AS) 5 and a CCF 8.

In order to set up a call, the session initiation protocol (SIP) can be used. The SIP has been developed to perform call/session control functions including assisting in establishing IP (internet protocol) sessions between subscribers. The SIP protocol provides a number of standardized requests and responses by means of which the session control functions may be performed between terminals. The SIP protocol is published as IETF RFC 2543 (and revisions), currently available from www.ietf.org.

The signaling steps shown in FIG. 2 are as follows:
1. INVITE from TE 1 to S-CSCF 10
   S-CSCF receives an INVITE message from terminal equipment 1 when a call is placed.
2. Initial accounting started. Generated ICID returned.
   In response to receiving the INVITE message, the S-CSCF 10 sends an Accounting Request (ACR) (START_RECORD) message to the CCF 8. This message starts accounting session in CCF and in this case causes the generation of an ICID. The message may contain information relating to the identity of the subscriber. The S-CSCF may access a Home Subscriber Server (HSS) (not shown) to determine the identity of the CCF associated with the subscriber of TE 1. Since the ACR (START_RECORD) message does not contain an ICID, when the CCF receives the ACR (START_RECORD) message from S-CSCF, the CCF will generate the ICID for the call which is being set up. The CCF will then send an Accounting Answer (ACA) message to the S-CSCF which includes the generated ICID.
3. INVITE from S-CSCF 10 to AS 5.
   The S-CSCF may then send an INVITE message with the ICID for the call, together with the identity of the CCF to an AS 5. The ICID is included in with the session initiation protocol (SIP) signaling.
4. AS performs a one time event. This may be any service that uses EVENT method charging. For example, the service may be such that data is added to Session Initiation Protocol (SIP) signaling that is made available to the called party.
   On performing the chargeable event, the AS sends an ACR (EVENT_RECORD) message to the CCF that includes the ICID for the call. The CCF detects that the ICID is included in the message and therefore does not generate a new one. In response to the ACR message, the CCF sends an ACA message to the AS.
5. INVITE from AS to S-CSCF.
   The INVITE message is routed back from the AS to S-CSCF. The AS may add information to the INVITE message.
6. INVITE towards terminating party.
   The INVITE message is sent towards the terminating party with the ICID included in the SIP signaling. The identity of the CCF may also be included in the INVITE message.

By virtue of the method described above, the generation of the ICID is therefore centralized at the CCF.

Once an ICID has been generated in relation to a call that same ICID is used by all the entities that generate charges for the call. The same ICID included as the charging ID field for each of their CDRs for the call. To allow this to happen the S-CSCF causes the ICID to be made available to other entities that may need to generate CDRs for the call. This can be done by including the ICID in the INVITE message sent from the S-CSCF, as described above. This may require the addition of an element to such protocols as they are presently formed, including the protocols that are used for communication with legacy networks such as Global Systems for Mobile Communicating (GSM) networks that may also need to generate CDRs. However, support for this feature allows the S-CSCF to send the ICID in an INVITE message to the other entities that may need to generate CDRs for the call, once it has received the ICID from the CCF.

When the call is complete the entities that need to generate charges for the call each generate CDRs that include the ICID of the call. These are sent to the CCF of the subscriber who is bearing the charges. For an AS that performs one time event, the CDR is sent when the call is complete or when the event is complete.

When the CCF receives a CDR it checks whether it has previously received a CDR having the same ICID as the newly received CDR. If it has not, the system forms a new transaction on the account of the user to whom the newly received CDR indicates a charge should be made. The new transaction is initially assigned to have value indicated in the CDR. When any more CDRs having the same ICID are received their value is added to the same transaction. The total value of the transaction is debited from the user's account. The transaction may be debited from the user's account as a single item so that the charges derived from different sources for a single call are transparent to the user. The transaction may be itemized so that the user can see how the total charge is made up.

The elements of the network that generate charges and that modify or use charging information support the transfer of charging information. In general, the protocols that are used between charge-generating network elements and between network elements that modify charging information may also support the transfer of the charging ID.

Embodiments of the present invention have been described with specific reference to the UMTS and GPRS systems. However, it is not limited to these systems.

The applicant draws attention to the fact that the present invention may include any feature or combination of features disclosed herein either implicitly or explicitly or any generalization thereof, without limitation to the scope of any of the present claims. In view of the foregoing description it will be evident to a person skilled in the art that various modifications may be made within the scope of the invention.

The invention claimed is:

1. A method, comprising:
  charging for services in a communication system comprising a charging entity;
  receiving a first message at the charging entity;
  determining that the first message does not include a charging identity; and
  generating a charging identity at the charging entity in response to determining that the first message does not include a charging identity;
  wherein the charging identity is generated to begin charging for a call or to generate a charging data record.

2. The method of claim 1, wherein the first message is an accounting request message.

3. The method of claim 2, wherein the first message is received from a second node.

4. The method of claim 3, wherein the second node has referred to a third node to determine an identity of the charging entity.

5. The method of claim 4, wherein the third node is a home subscriber server.

6. The method of claim 3, wherein the second node is a serving call state control function.

7. The method of claim 1, wherein the first message was sent in response to an invite message from a first node.

8. The method of claim 7, wherein the charging identity identifies the first node.

9. The method of claim 7, wherein the first node is a mobile terminal.

10. The method of claim 1, wherein the charging identity identifies a connection in the communication system.

11. The method of claim 1, further comprising: sending, by the charging entity, an accounting answer message in response to receiving said first message.

12. The method of claim 11, further comprising: including the charging identity in the accounting answer message.

13. The method of claim 12, wherein the charging identity is included by the second node in an invite message sent to a fourth node.

14. The method of claim 13, wherein the charging identity is included by the fourth node in an accounting request message sent to the charging entity.

15. The method of claim 13, wherein the fourth node is an application server.

16. A system, comprising:
  a charging entity configured to determine that a first message does not include a charging identity and, in response, to generate a charging identity that is used to begin charging for a call or to generate a charging data record.

17. The system of claim 16, a first node and a second node, wherein the first node is configured to transmit further comprising: an invite message to the second node, and
  the second node is configured to transmit the first message to the charging entity in response to receiving the invite message.

18. The system of claim 17, wherein the first node comprises a mobile terminal.

19. The system of claim 16, further comprising: a third node configured to store identities of a plurality of charging entities.

20. The system of claim 16, further comprising:
  a fourth node configured to receive a message including the charging identity, to transmit a second message including the charging identity, and to charge for services provided by said fourth node using said second message.

21. An apparatus comprising:
  a generator configured to generate a charging identity in response to receiving a first message when it is determined that the first message does not include a charging identity, wherein the charging identity is generated to begin charging for a call or to generate a charging data record.

22. The apparatus of claim 21, wherein the generator is configured to generate the charging identity upon receipt of an accounting request message.

23. The apparatus of claim 21, wherein the generator is configured to generate the charging identity upon receipt of the message from a second node.

24. The apparatus of claim 23, wherein the generator is configured to generate the charging identity upon receipt of the message from a serving call state control function.

25. The apparatus of claim 21, wherein the generator is configured to generate the charging identity to provide an identification of a first node.

26. The apparatus of claim 21, wherein the generator is configured to generate the charging identity to provide an identification of a connection in a communication system.

27. A method, comprising:
  charging for services in a communication system comprising a charging entity;
  directing a first message to be sent to the charging entity;
  determining that the first message does not include a charging identity; and
  generating a charging identity at the charging entity in response to determining that the first message does not include a charging identity, to begin charging for a call or to generate a charging data record,
  wherein the generating of the charging identity is centralized at the charging entity.

* * * * *